US010532757B2

(12) United States Patent
Jakubowski et al.

(10) Patent No.: US 10,532,757 B2
(45) Date of Patent: *Jan. 14, 2020

(54) PET STROLLER WITH REMOVABLE DIVIDER FOR ELEVATED SEATING WITHIN A CANOPY ENCLOSED SEATING AREA

(71) Applicant: Vermont Juvenile Furniture Mfg., Inc., West Rutland, VT (US)

(72) Inventors: Chris Jakubowski, Rutland, VT (US); Todd Jakubowski, Rutland, VT (US); Kristen Jakubowski, Rutland, VT (US)

(73) Assignee: Vermont Juvenile Furniture Mfg., Inc., West Rutland, VT (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/945,239

(22) Filed: Apr. 4, 2018

(65) Prior Publication Data

US 2018/0222510 A1 Aug. 9, 2018

Related U.S. Application Data

(62) Division of application No. 15/658,602, filed on Jul. 25, 2017, now Pat. No. 10,017,200.

(60) Provisional application No. 62/366,269, filed on Jul. 25, 2016.

(51) Int. Cl.
*A47C 7/62* (2006.01)
*B62B 5/00* (2006.01)
*B62B 9/18* (2006.01)
*A01K 1/00* (2006.01)
*B62B 9/20* (2006.01)
*B62B 7/08* (2006.01)

(52) U.S. Cl.
CPC .......... *B62B 5/0013* (2013.01); *A01K 1/0035* (2013.01); *A01K 1/0058* (2013.01); *B62B 9/18* (2013.01); *B62B 9/20* (2013.01); *B62B 7/08* (2013.01)

(58) Field of Classification Search
CPC .......... B62B 7/06; B62B 7/08; B62B 5/0013; B62B 9/00; B62B 9/18; B62B 9/14; B62B 9/142; B62B 9/26; B62B 2202/42; A01K 1/0236; A01K 1/0058; A01K 1/0035
USPC .......................................... 297/184.11, 184.1
See application file for complete search history.

(56) References Cited

U.S. PATENT DOCUMENTS

| | | |
|---|---|---|
| 3,556,546 A | 1/1971 | Garner |
| 3,689,099 A | 9/1972 | Patterson |
| 4,725,071 A | 2/1988 | Shamie |
| 4,836,573 A | 6/1989 | Gebhard |
| D317,280 S | 6/1991 | Takahashi et al. |
| D319,906 S | 9/1991 | Takahashi et al. |

(Continued)

OTHER PUBLICATIONS

*Stefanplast Gulliver Touring IATA Pet Carrier Divider, 4 pages, downloaded on Jun. 30, 2016, https://www.pawrus.com.sg/stefanplast-gulliver-touring-iata-pet-carrier-divider.

*Primary Examiner* — Chi Q Nguyen
(74) *Attorney, Agent, or Firm* — Volpe and Koenig, P.C.

(57) ABSTRACT

A divider for elevated seating within a canopy enclosed seating area of a pet stroller is provided. The divider is removably located in the pet seating area. The divider includes a divider platform supported at least on a platform enclosure member of the pet stroller which still allows for the lowering and clamping of the lower canopy bar to the platform enclosure member.

17 Claims, 13 Drawing Sheets

(56) References Cited

U.S. PATENT DOCUMENTS

| | | | |
|---|---|---|---|
| 5,265,289 A * | 11/1993 | Swiger | A47D 5/006 190/2 |
| D367,771 S * | 3/1996 | Julian | 5/655 |
| 5,615,443 A * | 4/1997 | Lai | A46B 9/045 15/145 |
| 5,893,577 A | 4/1999 | Takahashi | |
| 5,988,670 A | 11/1999 | Song et al. | |
| 6,059,302 A | 5/2000 | Huang | |
| 6,139,046 A | 10/2000 | Aalund et al. | |
| 6,378,445 B1 * | 4/2002 | Willard, Sr. | A47B 3/08 108/115 |
| 6,389,624 B1 * | 5/2002 | Madole | A47D 5/006 5/424 |
| 6,581,228 B1 * | 6/2003 | Boskovich | A47D 5/006 108/115 |
| 6,866,008 B1 | 3/2005 | Havard | |
| 7,090,242 B1 | 8/2006 | Sheinall et al. | |
| 7,618,055 B2 * | 11/2009 | Chuah | A47D 5/006 280/47.41 |
| 8,151,389 B1 * | 4/2012 | Lando | A47D 5/006 5/655 |
| 8,480,114 B1 | 7/2013 | Grantz | |
| 9,232,862 B1 * | 1/2016 | Arch | A47D 5/006 |
| 9,357,842 B2 * | 6/2016 | Gu | A47B 85/06 |
| 9,596,962 B2 * | 3/2017 | Davis | A01K 13/00 |
| 10,017,200 B2 * | 7/2018 | Jakubowski | B62B 5/0013 |
| 2003/0209883 A1 | 11/2003 | Hsia | |
| 2010/0244393 A1 | 9/2010 | Thomas et al. | |
| 2011/0025022 A1 | 2/2011 | Li | |
| 2011/0227373 A1 | 9/2011 | Cone, II | |
| 2013/0174793 A1 * | 7/2013 | Powell | A01K 13/001 119/652 |
| 2014/0097598 A1 | 4/2014 | Sundberg et al. | |
| 2014/0230747 A1 | 8/2014 | Jakubowski | |
| 2015/0291200 A1 | 10/2015 | Taylor et al. | |
| 2016/0016601 A1 | 1/2016 | Velichko | |
| 2018/0022371 A1 | 1/2018 | Jakubowski et al. | |

\* cited by examiner

PET STROLLER WITH REMOVABLE DIVIDER FOR ELEVATED SEATING WITHIN A CANOPY ENCLOSED SEATING AREA

INCORPORATION BY REFERENCE

The following documents are incorporated herein by reference as if fully set forth: U.S. patent application Ser. No. 15/658,602, filed Jul. 25, 2017, now U.S. Pat. No. 10,017,200; and U.S. Provisional Patent Application No. 62/366,269, filed Jul. 25, 2016.

BACKGROUND

The invention relates to a pet stroller, more particularly, to a foldable pet stroller which is openable to a use position, and foldable, when not in use, to a compact storage position having a removable divider for elevated seating within canopy enclosed seating area.

Foldable pet strollers of the above-noted type are known and can be used for walking small or medium sized pets, such as dogs or cats, in a manner similar to a toddler stroller. These strollers typically are formed with a metal frame having a cloth and mesh holding assembly attached to the metal frame which define a seating area as well as a cloth and mesh canopy. Typically, the metal frame includes front and rear wheel struts which are pivotally connected to a handle and a seating area platform, as well as additional support structure. These frame members are pivotably connected at certain pivot areas to allow pivoting movement between the handle, the front struts and the rear struts in order to extend the frame from the compact storage position to a use position where the handle and struts can be locked in position using lock assemblies, and can then be re-folded back down to the compact storage position upon releasing the locks. In the compact storage position, the handle and struts generally fold to a position adjacent to one another, and the cloth and mesh seating area and canopy generally collapse together.

Typically pet strollers include the canopy having a mesh area so that a pet can be confined in the seating area without having to be clipped or tied in by a lead that is connected to the stroller. In the known pet strollers, this mesh is zipperable to a portion of the pet stroller seating area platform, and can be moved between opened and closed positions. In the unzipped position of the canopy, this leaves a loose mesh as part of the platform seating area sidewall that remains unsupported and floppy in use. With no retaining sidewall area surrounding the pet seating area, even if the pet is connected to a lead, it could jump or slip part way out of the stroller and accordingly, it is necessary for all practical purposes to have the mesh zipper closed while in use.

It would be desirable to provide such a pet stroller with a platform seating area having a sidewall which is defined and usable when the canopy is opened. Further, it would be desirable to provide a way that such strollers could be used with small or very small pets, without major modification.

SUMMARY

Briefly stated, a pet stroller with a removable divider for elevated seating within a canopy enclosed seating area is provided. The pet stroller has a frame assembly including a handle, a platform member pivotably connected to front and rear wheel assemblies, with the platform member defining a platform base in a use position, and a platform enclosure member connected to the frame assembly that in the use position is generally parallel to the platform member. A cloth platform enclosure is connected to the platform enclosure member and the handle which defines a base and a sidewall of a pet seating area, and a canopy bar is pivotably connected to the frame assembly to extend or retract a canopy over the pet seating area. A canopy assembly is connected to the handle and the canopy bar and includes at least one mesh portion. The canopy is connectable to the platform enclosure member, for example by a latch or a zippered connection to the cloth platform enclosure, to form an enclosed pet seating area. A divider is removably located in the pet seating area. The divider includes a divider platform supported at least on the platform enclosure member while still allowing the lower canopy bar to be clamped to the platform enclosure member.

In one aspect, the divider platform has an outer periphery that overlaps the platform enclosure member at least in sections. In a preferred embodiment, the outer periphery that that overlaps the platform enclosure member at least in sections has a receiving groove formed therein that is complementary to the upper portion of the platform enclosure member.

In another aspect, an outer periphery of the divider platform is complementary to an inner contour of the pet seating area in sections that do not overlap the platform enclosure member.

In another aspect, the divider platform has an upper surface with a seating pad connected thereto using a releasable hook-and-loop type textile fastener, such as VEL-CRO®. The divider platform may also be perforated for ventilation or drainage.

In another aspect, the divider platform is formed of two parts that are connected together by a hinge. The hinge is preferably limited to a 180° open position.

In another aspect, at least one foldable support leg is connected to an underside of the divider platform. The at least one support leg has an extended height that allows for contact and support on the platform base.

In another aspect, at least one tether is connected to the divider.

The divider can be installed in the pet seating area to provide an elevated seating area within the canopy enclosed pet seating area that is suitable for small to very small pets, while at the same time providing an additional storage area in the pet stroller between the divider and the platform base. This can be done without any structural changes to the known stroller while still maintaining all of the original functionality.

In one arrangement, a latch is connected to the platform enclosure member and is movable to a latched position in which it clamps a lower canopy bar to the platform enclosure member.

In one arrangement of the pet stroller, the frame assembly includes front and rear wheel struts. The handle has a handle portion that is located between two ends that extend away from the handle portion. The handle is connected to the rear wheel struts by rear pivot blocks located at the top of the rear wheel struts at positions spaced apart from the two ends. The two ends of the handle are connected by front pivot blocks to the tops of the front wheel struts. Moveable lock assemblies are located on the handle adjacent to the ends that are lockable to the front pivot blocks such that the handle is generally aligned with the front wheel struts in a use position of the stroller, with the lock assemblies engaged to corresponding ones of the front pivot blocks. The platform member is pivotally connected to the front and rear wheel struts, and supports the platform base in the use position. At least one front crossbar is located between the front struts. The wheel assemblies are located at the bottom ends of the rear struts and below the front struts or a cross member extending between the front struts for a three-wheeled stroller. The platform enclosure member is pivotally connected to the rear pivot blocks located on a handle above the lock assemblies that pivots to a use position generally parallel to the platform member. The canopy assembly includes an upper canopy bar, and the upper and lower canopy bars are pivotally connected to the rear pivot blocks and are pivotal to extend or retract the canopy over the pet seating area.

The frame assembly is not limited to a particular number of front or rear wheel struts, and the specific arrangement of the frame members and platform members can be varied.

In another aspect, the upper and lower canopy bars that are pivotally connected to the rear pivot blocks are pivotal about the same axis, providing simpler assembly.

In another aspect, a lower storage bag is connected to the rear struts and the at least one front crossbar.

In order to allow more compact folding, the base board is preferably provided in two pieces which are movable relative to one another to allow for folding.

Preferably, the pet stroller is foldable to a compact position by releasing the movable lock assemblies on the ends of the handle, releasing the latch, and disengaging the clip on the baseboard from the platform member. To the extent that the divider is used, it is first removed, and can preferably also be folded to a compact storage position and stowed.

In another aspect, in the use position of the stroller, the canopy assembly is movable to an open position, with the platform member, the platform enclosure member, and the cloth platform enclosure remaining in the use position providing a partial enclosure with a sidewall that extends around a complete periphery of the pet seating area.

BRIEF DESCRIPTION OF THE DRAWINGS

The following detailed description of the preferred embodiments of the invention will be better understood when read with reference to the appended drawings. For the purposes of illustrating the invention, there is shown in the drawing an embodiment which is presently preferred. It is understood, however, that the invention is not limited to the precise arrangements and instrumentality shown in the drawings.

DETAILED DESCRIPTION OF THE PREFERRED EMBODIMENTS

Figure 1:
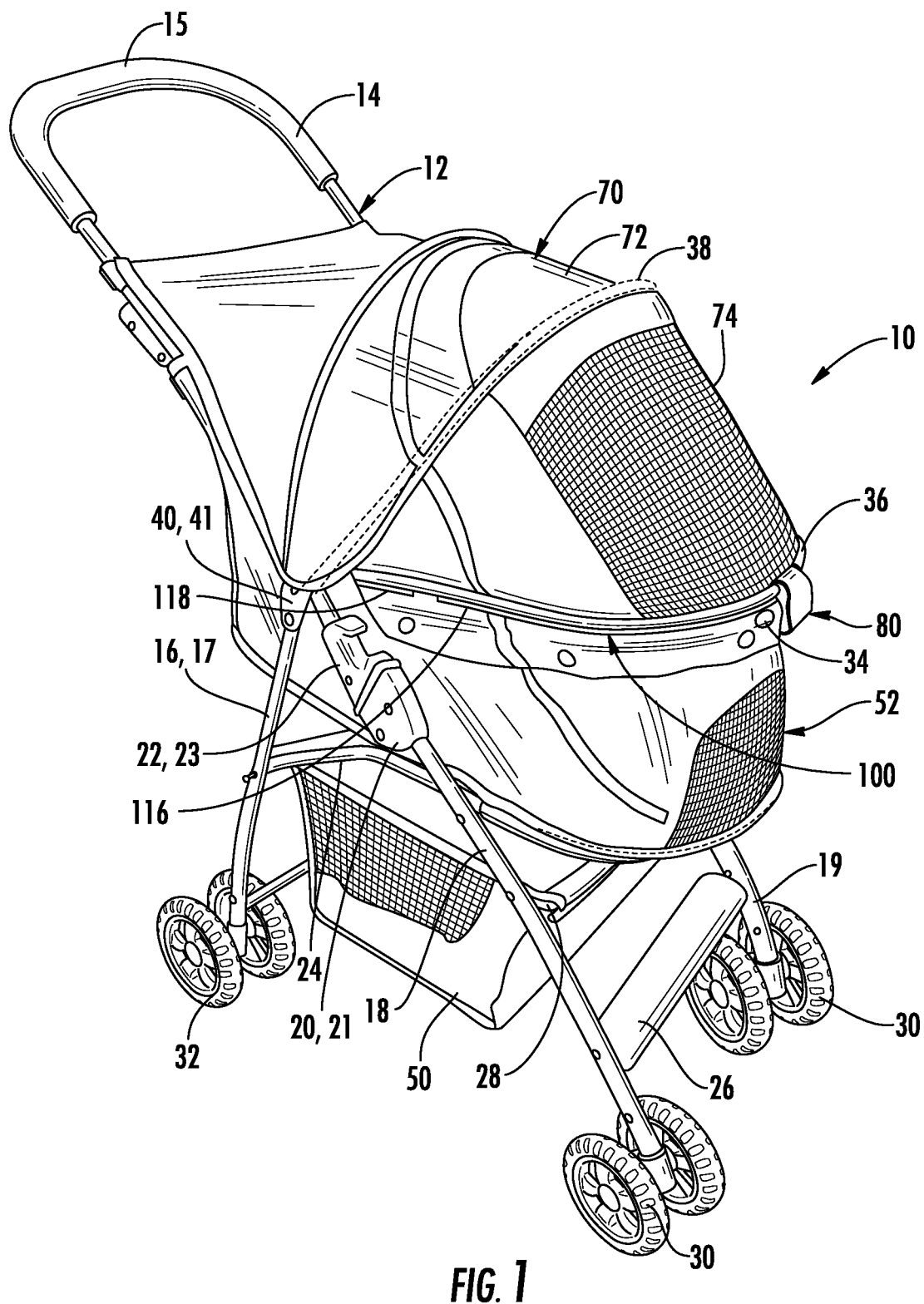
FIG. 1 is a top, front, right perspective view of the pet stroller with a removable divider for elevated seating located within a canopy enclosed seating area according to the invention.

Certain terminology is used in the following description for convenience only and is not limiting. The words "right", "left", "top", "bottom", "front", and "back" designate directions in the drawings to which reference is made. The words "inwardly" and "outwardly" refer to directions toward and away from, respectively, the geometric center of the pet stroller and designated parts thereof. This terminology includes the words specifically noted above, derivatives thereof and words of similar import. The words "a" and "one", as used in the claims and in the corresponding portion of the specification, are defined as including one or more of the referenced item unless specifically stated otherwise. A list of items in the form "at least one of A, B, or C" where A, B, and C represent various elements of the invention, means any one of A, B, or C or various combinations thereof.

Figure 2:
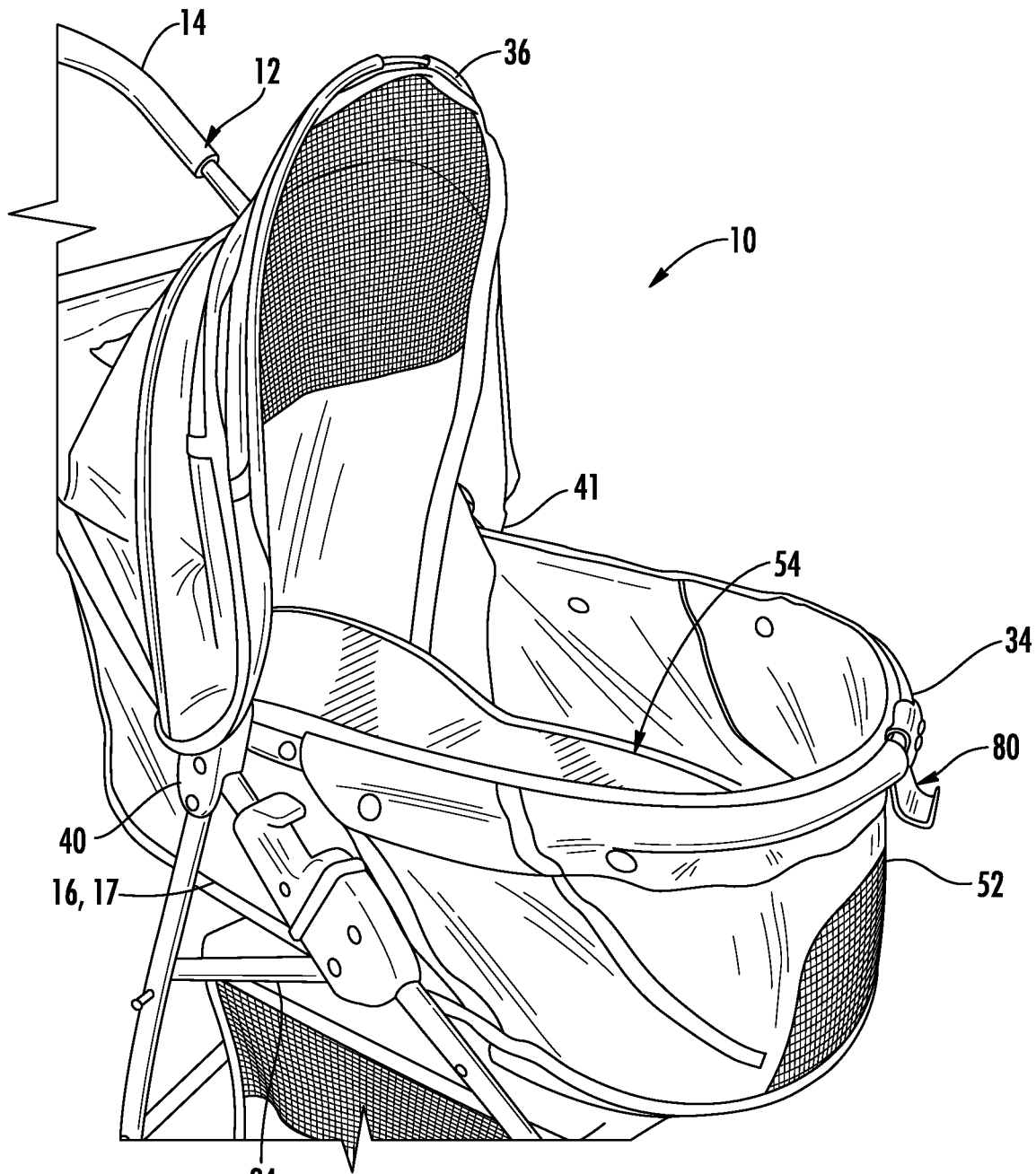
FIG. 2 is an enlarged view of the front portion of the pet stroller shown in FIG. 1 showing pet seating area inside the open canopy without the divider installed.
Figure 15:
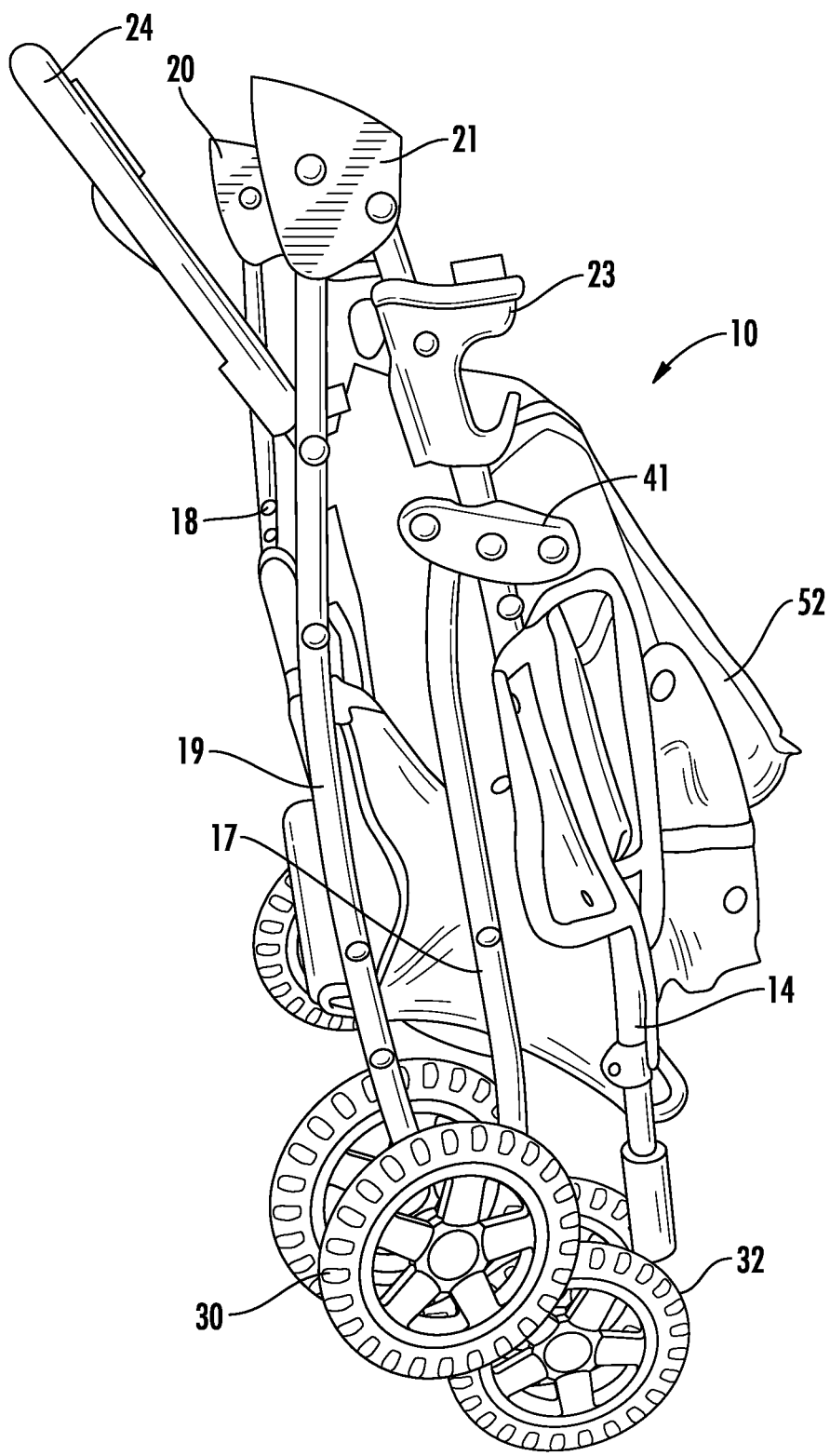
FIG. 15 is a side view showing the pet stroller in a compact folded position.

Referring now to FIGS. 1 and 2, a pet stroller 10 in accordance with the present invention is shown in the use position with the canopy closed (FIG. 1), in the use position with the canopy open (FIG. 2). The pet stroller 10 can also be folded into a folded, storage position as shown in FIG. 15.

Figure 8:
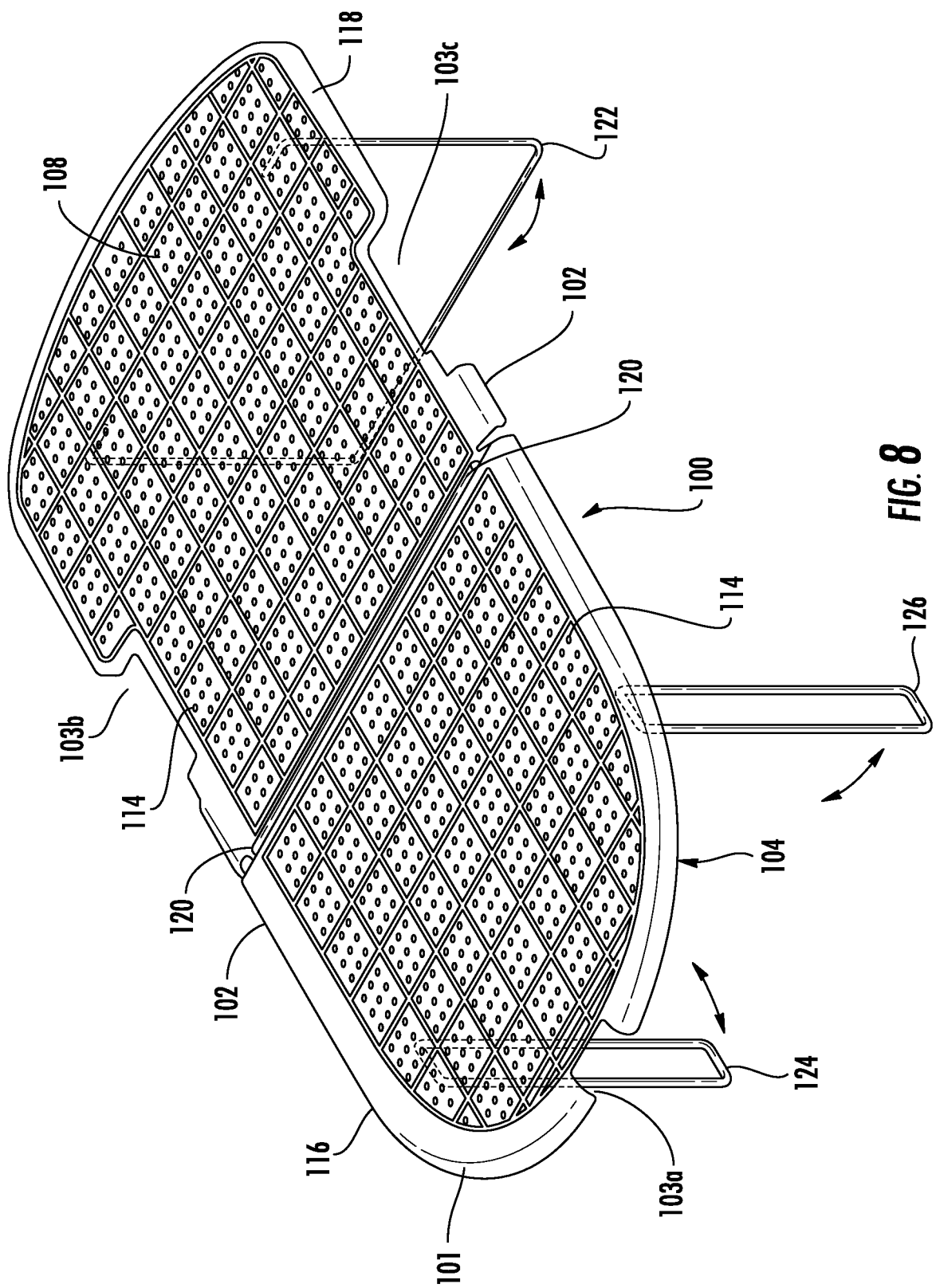
FIG. 8 is a perspective view of a preferred divider.
Figure 9:
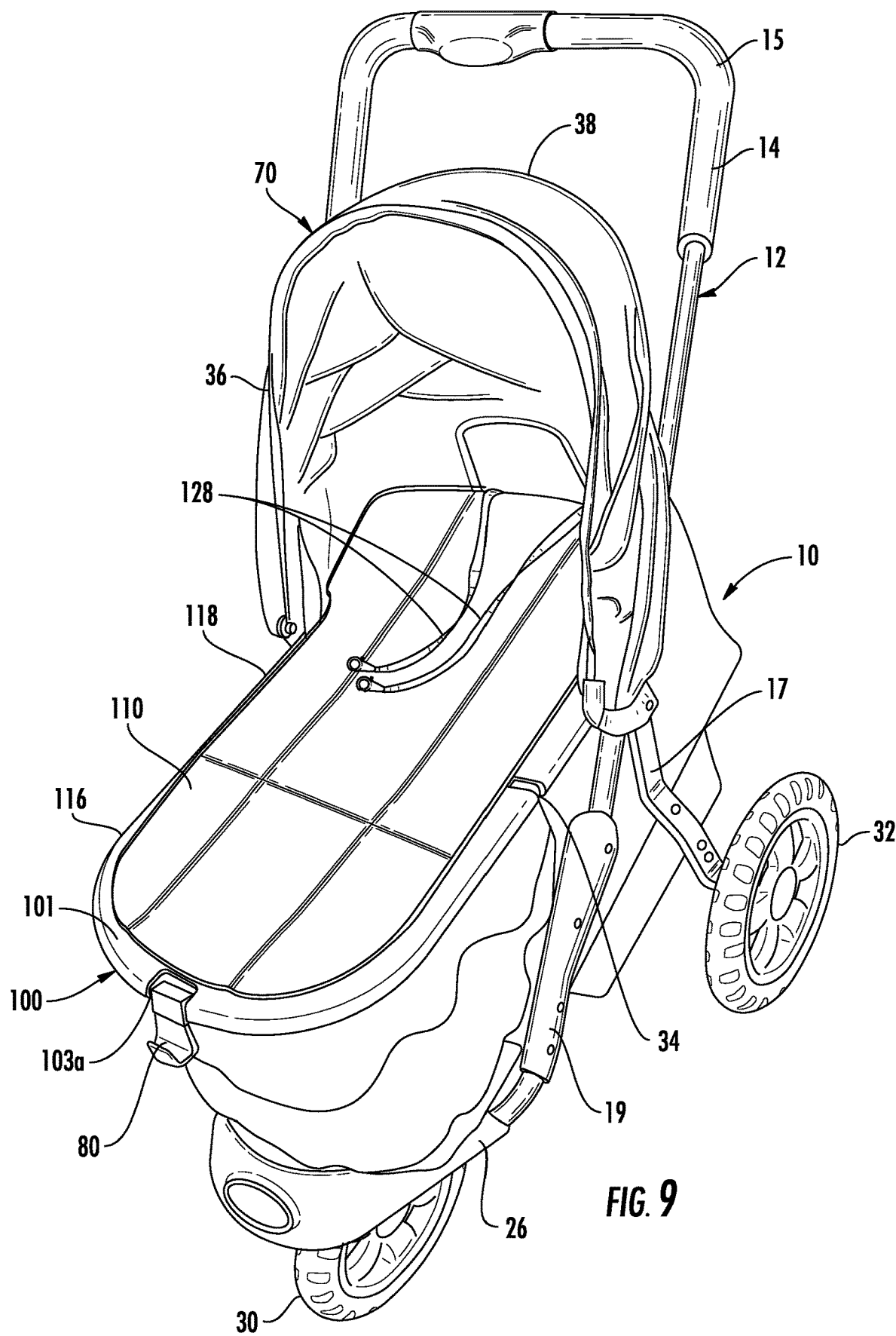
FIG. 9 is a perspective view of the pet stroller shown with the canopy open with the removable divider for elevated seating being visible within the canopy enclosed seating area.
Figure 11:
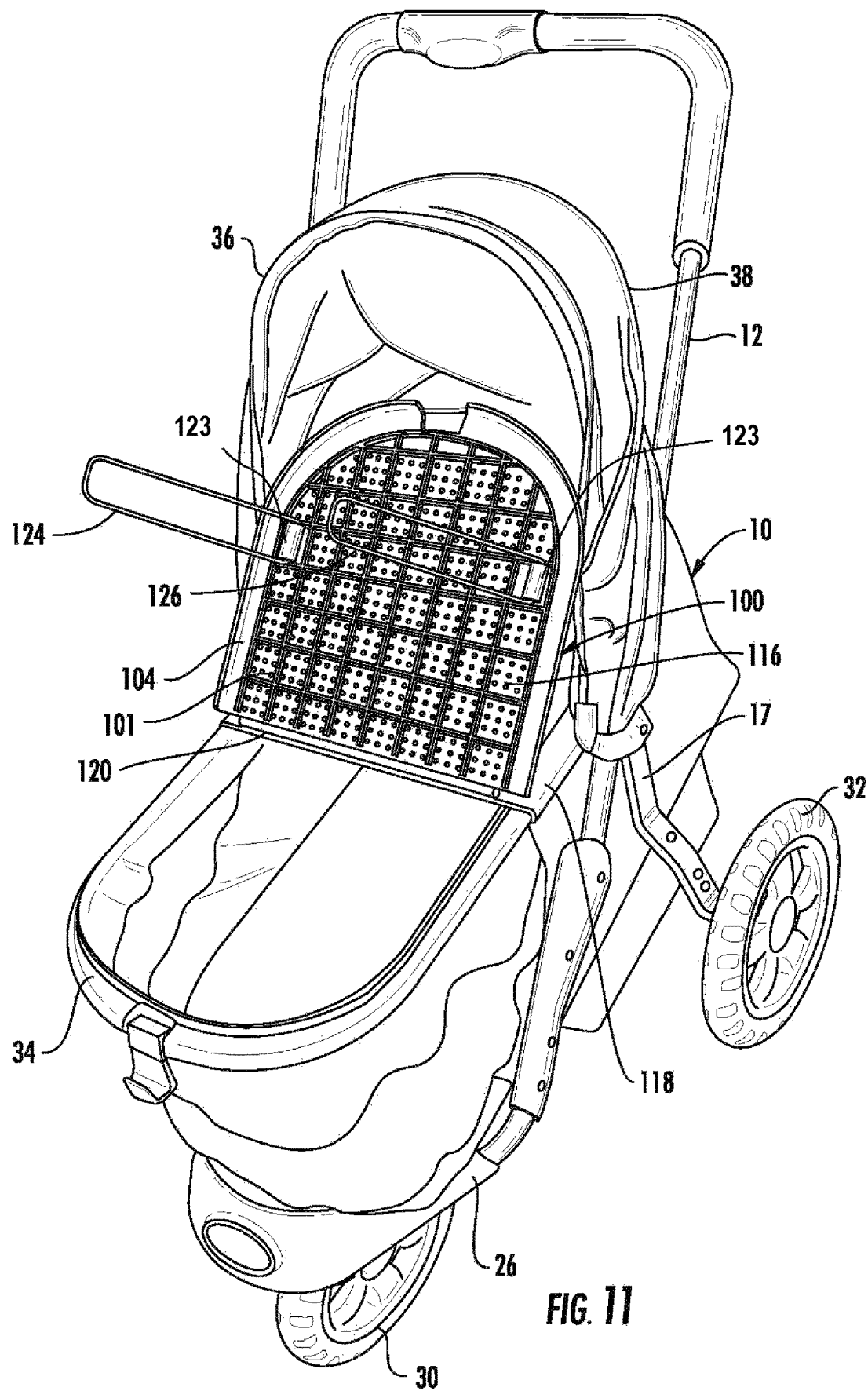
FIG. 11 is a view similar to FIG. 10, showing the divider in a partially folded configuration to access the area under the divider within the pet seating area that can be used for storage.
Figure 12:
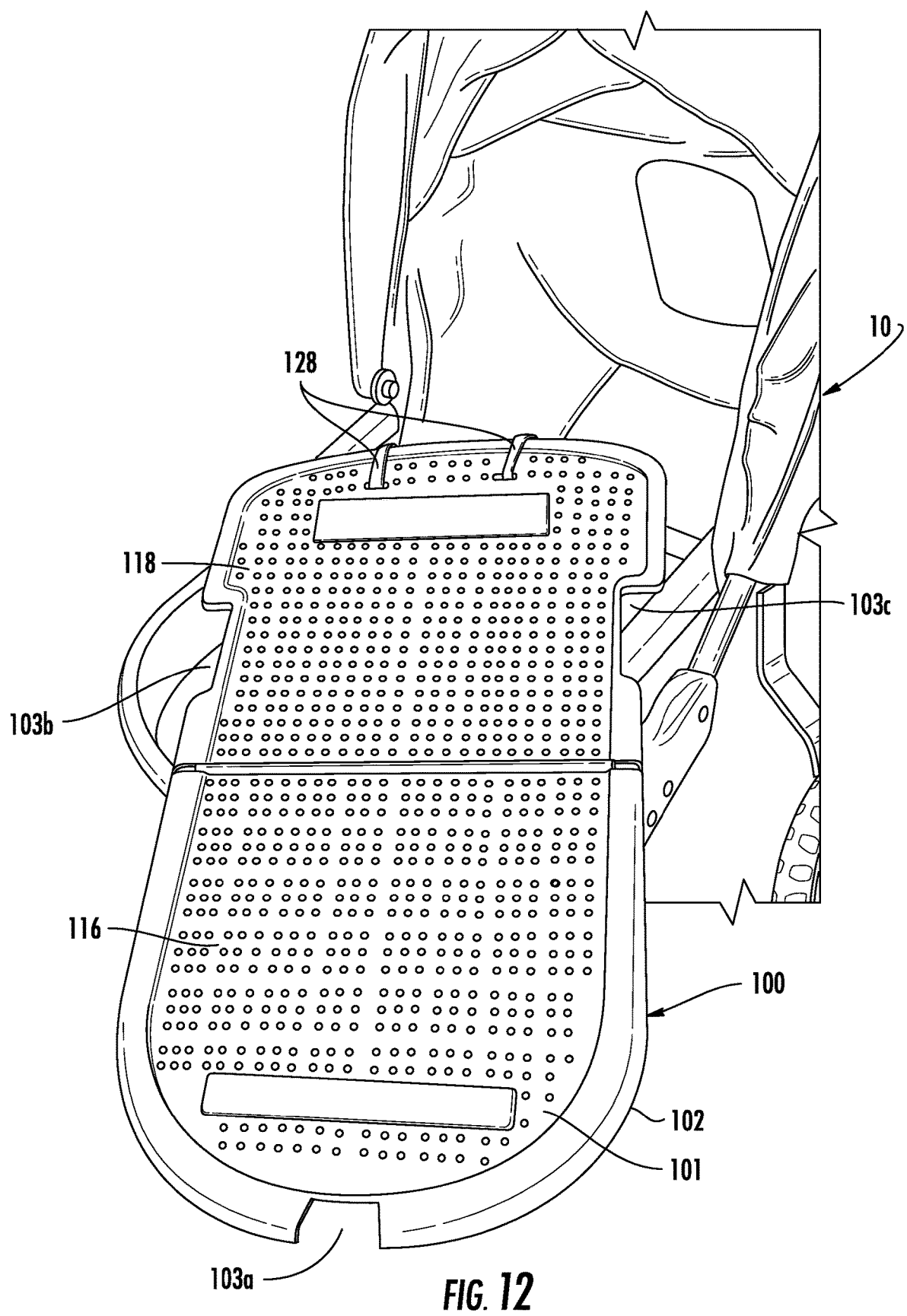
FIG. 12 is a view of the divider pulled partially out of the pet seating area.
Figure 13:
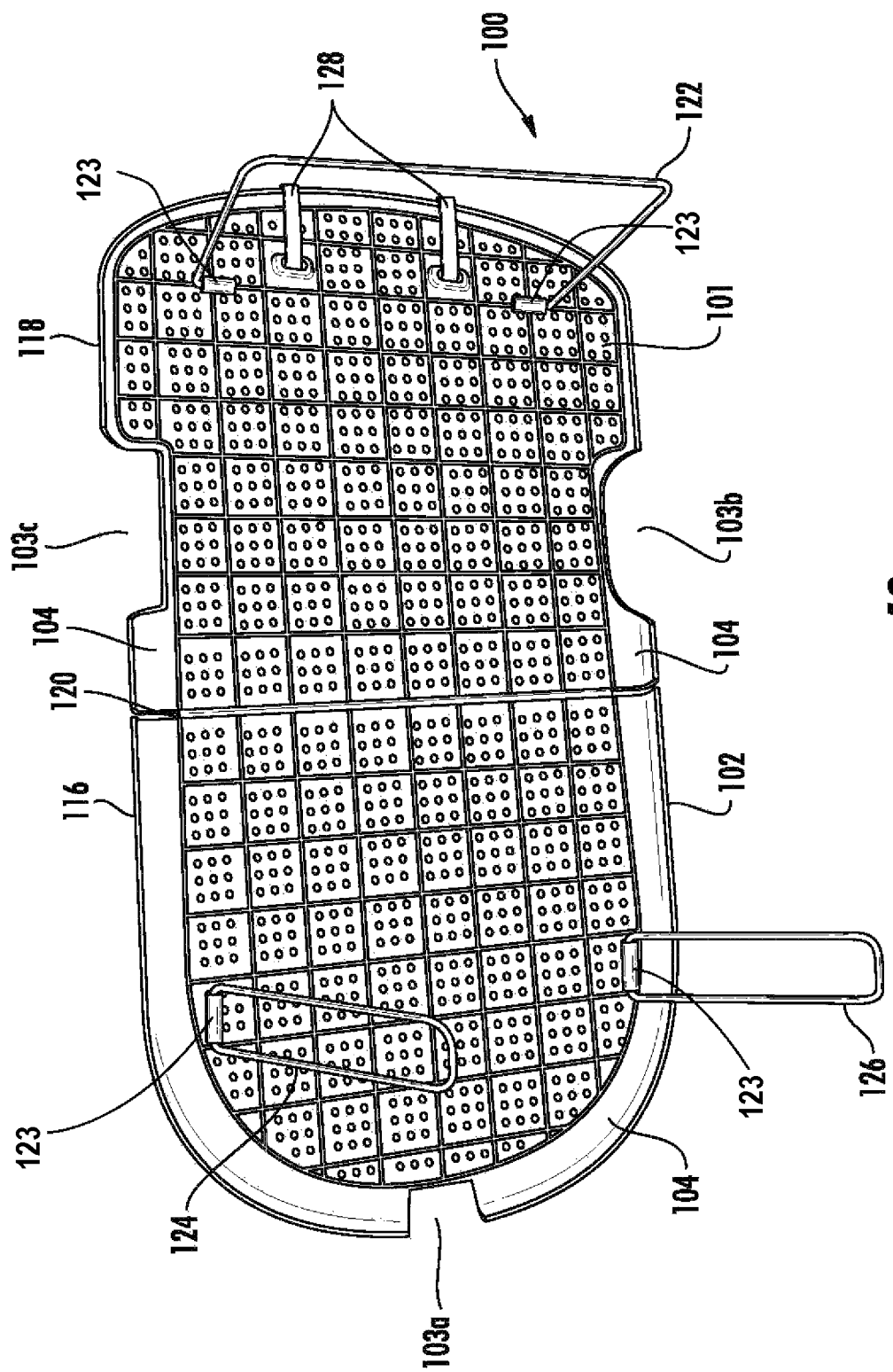
FIG. 13 is a detail view of the underside of the divider showing foldable support legs.

A divider 100 shown in detail in FIGS. 8 and 13 is removably located in the pet seating area as shown in FIG. 9. The divider 100 provides an elevated seating area within the canopy enclosed pet seating area that is suitable for small to very small pets, while at the same time providing an additional storage area in the pet stroller 10 between the divider 100 and the platform base, as shown in FIG. 11. This can be done without any structural changes to the pet stroller 10 while still maintaining all of the original functionality.

As shown in FIG. 1, the pet stroller 10 includes a frame assembly 12 having two rear wheel struts 16, 17 and two front wheel struts 18, 19. A handle 14, preferably formed as a bent tube, that has a handle portion 15 and two ends that extend away from the handle portion 15 is connected to the frame 12 at the two rear wheel struts 16, 17, by rear pivot blocks 40, 41 (shown most clearly in FIG. 11), which are spaced apart from the two ends of the handle 14. These two ends of the handle 14 are connected by front pivot blocks 20, 21 to the tops of the front wheel struts 18, 19. Movable lock assemblies 22, 23 are located on the handle 14 adjacent to the ends that are lockable to the front pivot blocks 20, 21 such that the handle 14 is generally aligned with the front wheel struts 18, 19 in a use position of the stroller 10, as shown in FIGS. 1 and 9, with the lock assemblies 22, 23 engaged with respective ones of the front pivot blocks 20, 21. The lock assembly 23 is shown in the disengaged position from the front pivot block 21 in FIG. 15. These front pivot blocks 20, 21 and locking assemblies 22, 23 are of the type known in the prior art such as in the Pet Gear Happy Trails™ Pet Stroller (item no. PG8100ST of Pet Gear, Inc., West Rutland, Vt.).

Figure 5:
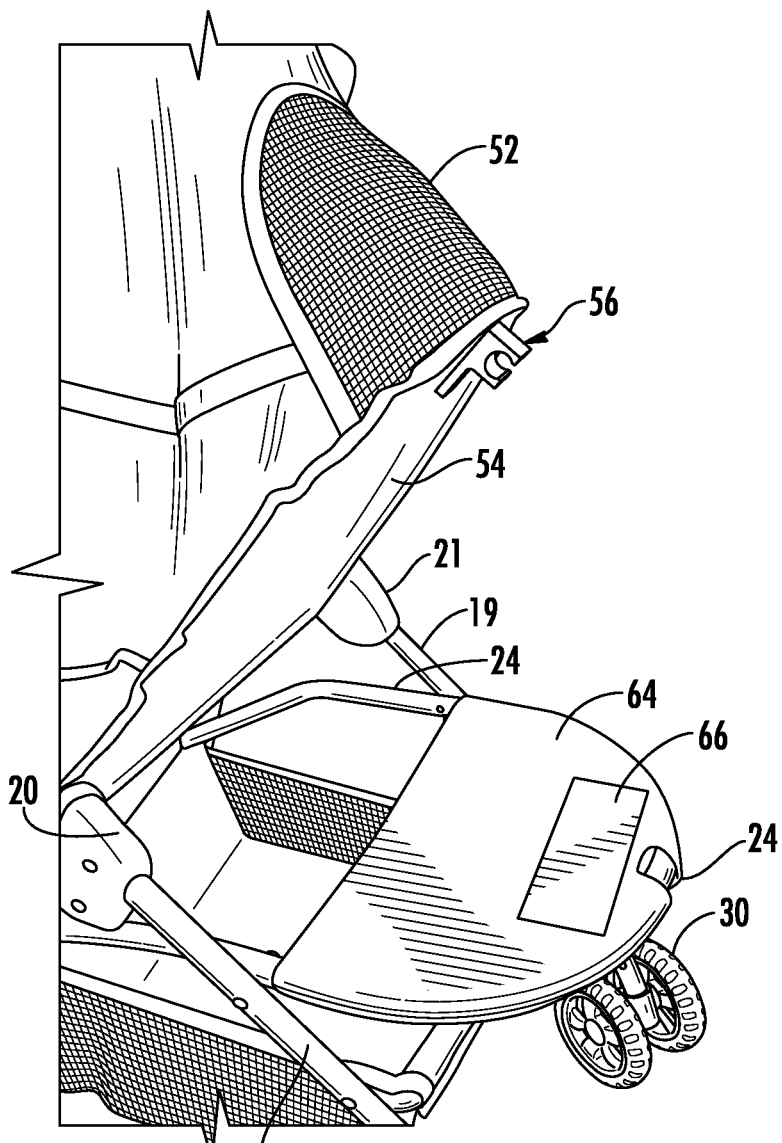
FIG. 5 is a view looking down at the platform member of the frame with the base board not yet in the use position, illustrating the attachment clip.

A platform member 24 is pivotally connected to the front wheel struts 18, 19 and the rear wheel struts 16, 17, as shown in FIGS. 1 and 5. This defines a platform base in the use position. At least one front crossbar (26, 28) extends between the front wheel struts 18, 19 and preferably, two front crossbars (26, 28) are provided. Wheel assemblies 30, 32 are preferably connected to the bottoms of the front and rear wheel struts 18, 19; 16, 17 which allow the stroller 10 to be rolled in the use position. The front wheel assemblies 30 and the rear wheel assemblies 32 may be single or double wheels. These types of wheel assemblies 30, 32 are also known from the prior art pet stroller from Pet Gear noted above. Additionally, while two front wheel assemblies 30 are shown, a single front wheel assembly located medially between the front struts and mounted to a cross member that extends between them could also be provided.

Figure 3:
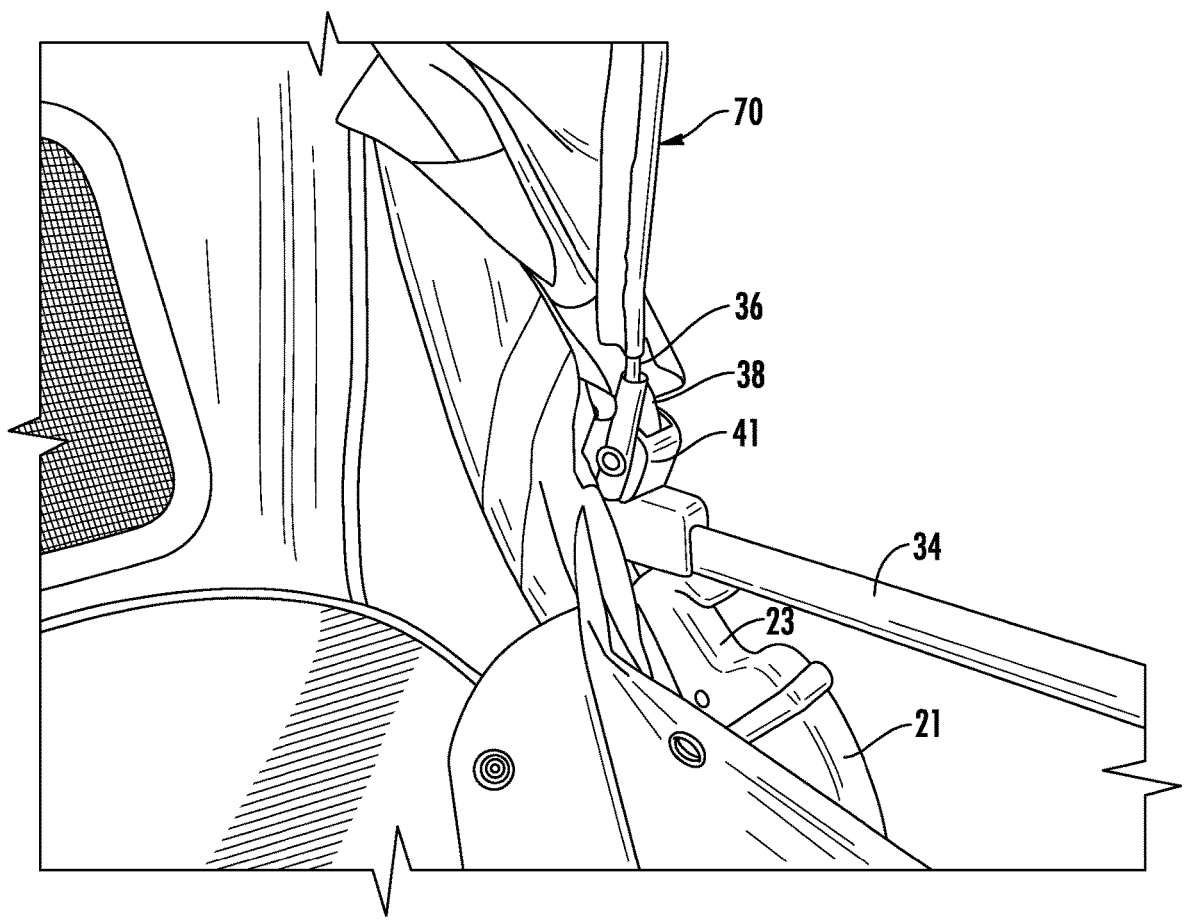
FIG. 3 is an enlarged detail view showing a pivot attachment point of the upper and lower canopy bars to the rear pivot block.
Figure 4:
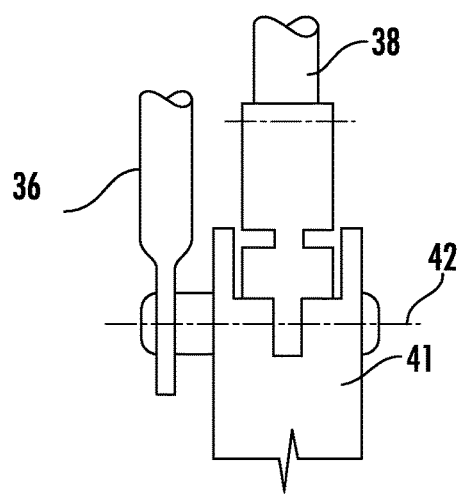
FIG. 4 is a detail view showing the assembly of the upper and lower canopy bars to the pivot block to pivot about the same axis.

A platform enclosure member 34 is pivotally connected to the rear pivot blocks, shown most clearly in FIGS. 2-4, at a position located on the handle 14 above the lock assemblies 22, 23. The platform enclosure member 34 pivots to a use position generally parallel to the platform member 24.

Figure 6:
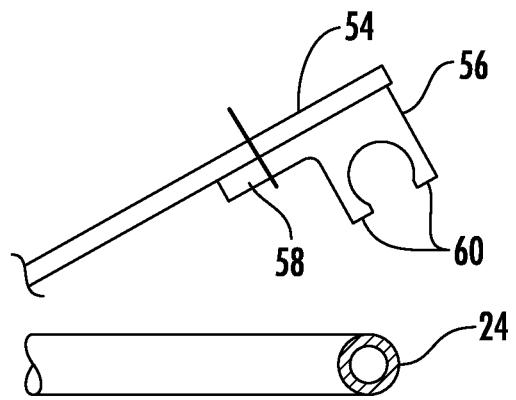
FIG. 6 is a detailed view showing the attachment clip on the base board prior to attachment with the platform member.
Figure 7:
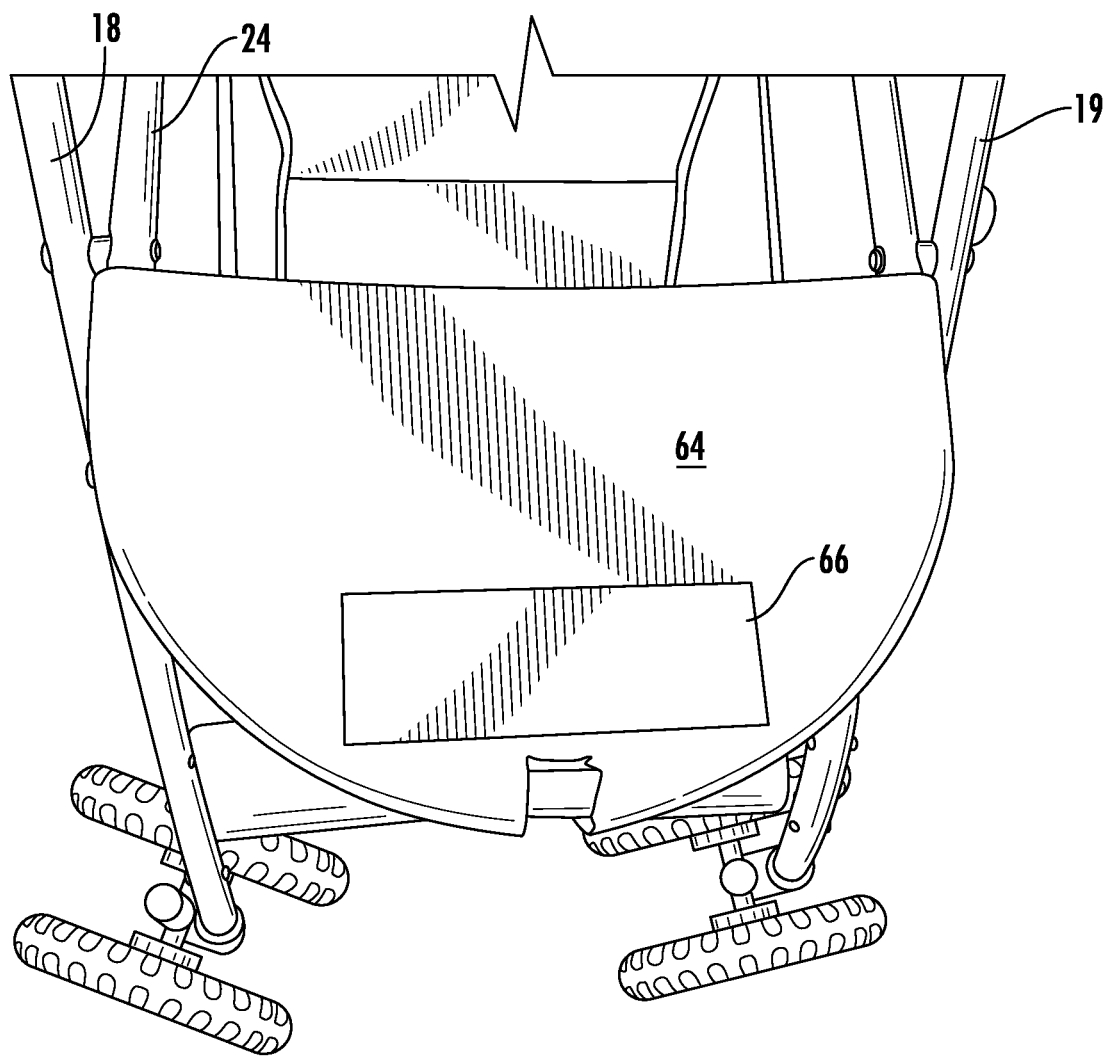
FIG. 7 is a view looking down at the platform member along with the platform cover.

A cloth platform enclosure 52 is connected to the platform enclosure member 34 and the handle 14, and defines a base and a sidewall of the pet seating area. This cloth platform enclosure 52 can be a textile cloth, non-woven cloth or a plastic membrane, and preferably is sewn together and includes at least some mesh areas in addition to solid areas. However, it could be all solid, and/or the sidewall portion could be all mesh. As used herein, "cloth" is intended to generically refer to any or all of the above with respect to the platform enclosure 52. The cloth platform enclosure 52 further can include textile fasteners and/or snaps for connection to the frame assembly 12. Preferably a baseboard 54, shown in FIGS. 5 and 6, is located in or under the base portion of the cloth platform enclosure 52 to provide some stiffness to the base. This rests on the platform member bar 24 in the use position of the stroller 10 and can be disconnected from the platform member 24 upon folding the stroller 10 as shown in FIGS. 5 and 6.

The base board 54 and the cloth platform assembly 52 are preferably held to the platform member 24, as shown in FIGS. 5 and 6, by a holding clip 56 connected via its bottom 58 to the base board 54. The clip 56 preferably has an engaging portion with flexible walls 60 that can be engaged or disengaged from the platform member 24 through a snapping action. Additionally, a platform cover 64 can be provided on the platform member 24, and a hook-and-loop textile fastener 66 can be used on the platform cover 64 and a corresponding position on the bottom of the base board 54 in proximity to the clip 56. This provides for stable positioning of the pet seating area formed by the cloth platform enclosure on the frame assembly 12.

Referring again to FIGS. 1 and 5, an upper canopy bar 38 and a lower canopy bar 36 are pivotally connected to the rear pivot blocks 40, 41. The upper and lower canopy bars 38, 36 are pivotable to extend or retract a canopy over the pet seating area. A cloth canopy assembly 70 is connected to the handle 14 and the upper and lower canopy bars 38, 36. The canopy assembly 70 is preferably made from cloth 72 and includes a mesh portion 74. The cloth can be woven or non-woven textile or a polymeric membrane. The canopy could be all cloth or all mesh, if desired, or a combination of the two as shown. Alternatively, some or all of the canopy could be formed from a clear, flexible polymeric material. As used herein, "cloth" is intended to generically refer to any or all of the above with respect to the canopy assembly 70.

Preferably, a latch 80 is connected to the platform enclosure member 34 in a front position and is adapted to clamp the lower canopy bar 36 to the platform enclosure member 34 to form an enclosed pet seating area. Various latch configurations can be used. Alternatively, a zipper half can be provided along a bottom portion of the cloth canopy assembly that can be zippered to a corresponding mating zipper half that is connected to the cloth platform enclosure 52 along the platform enclosure member 34.

Referring to FIG. 2, the pet stroller 10 is shown in the use position with the canopy open, without the divider 100 installed. Here it can be seen that the upper and lower canopy bars 38, 36 are both connected to the rear pivot blocks 40, 41 by a pivot pin. As shown in FIG. 4, which is a detail of the right side rear pivot block 41, both the upper and lower canopy bars 38, 36 are preferably connected to the rear pivot block 41 by a single fastener so that they are pivotable about the same axis 42. While only the right side is shown, the left side with the pivot block 40 is assembled in the same manner with the opposite ends of the upper and lower canopy bars 38, 36.

Referring to FIG. 1, a lower storage bag 50 is preferably connected to the frame assembly 12 beneath the platform member 24. This is preferably also a cloth and mesh assembly. The cloth can be a woven or non-woven textile or a polymeric membrane. Preferably, the lower storage bag 50 is connected to the rear wheel strut 16, 17 and at least one front crossbar 28.

As shown in FIGS. 1 and 5, the canopy assembly 70 is preferably connected to the handle 14 as well as the upper and lower canopy bars 38, 36. This can be done with snap or textile fasteners or through other means such as holding blocks that are attached to the cloth material of the canopy assembly and portions of the frame members using fasteners, such as screws, rivets, or other suitable connectors. In a preferred embodiment, the canopy assembly 70 is connected to a top of the cloth platform enclosure 52 such that the cloth platform enclosure 52 and the canopy assembly 70 are formed as a single textile assembly.

In order to allow folding of the pet stroller 10 to the compact stowage position as shown in FIG. 15, preferably the baseboard 54 is formed in two pieces to allow for folding. In order to fold the pet stroller 10 to the compact position shown in FIG. 11, the movable lock assemblies 22, 23 are slid upwardly on the handle 14 in order to disengage from the front pivot blocks 20, 21 and the handle is folded downwardly. Additionally, the over-center latch assembly 80 is released and the clip 86 is disengaged from the platform enclosure member 34. The baseboard 54 and the cloth platform assembly 52 is also disengaged from the platform member 24, shown in FIGS. 8 and 9, by releasing the holding clip 56 on the base board 54 from the platform member 24. The additional attachment of the cloth cover 64 to the platform member 24 via the textile hook and loop fastener 66 can also be separated.

In the use position shown in FIG. 1, the upper canopy assembly 70 can be opened or closed in order to provide access for a pet to be placed into or removed from the pet seating area defined by the cloth platform enclosure 52. The platform enclosure member 34 provides a stiff frame member so that a complete circumferential sidewall is defined around the entire pet seating area regardless of whether the canopy assembly 70 is in the closed position shown in FIG. 1 or the open position shown in FIG. 5. This arrangement allows a pet to be comfortably seated and contained regardless of the canopy position. In the closed position of the canopy assembly 70, the pet is safely contained. In order to use the pet stroller 10 with the canopy assembly 70 in the open position without the divider 100, a tether or leash can be provided that is fastened to the frame or the baseboard within the pet seating area and can be clipped to a collar or harness on the pet.

The pet stroller 10 provides a pet seating area with a defined platform enclosure member as part of the frame assembly as well as a cloth platform enclosure 52 with a complete continuous sidewall regardless of whether or not the canopy assembly 70 was in an open or closed position, making a safer, more pet friendly arrangement.

In order to improve the functionality of the pet stroller 10 for smaller pets, the divider 100 can be installed as shown in FIG. 8. The canopy assembly 70 can still be closed with the divider 100 in position, as shown in FIG. 1.

The divider 100 includes a divider platform 101 and is removably located in the pet seating area and is supported at least on the platform enclosure member 34 while still allowing the lower canopy bar 36 to be clamped to the platform enclosure member 34, preferably with the latch 80.

Figure 10:
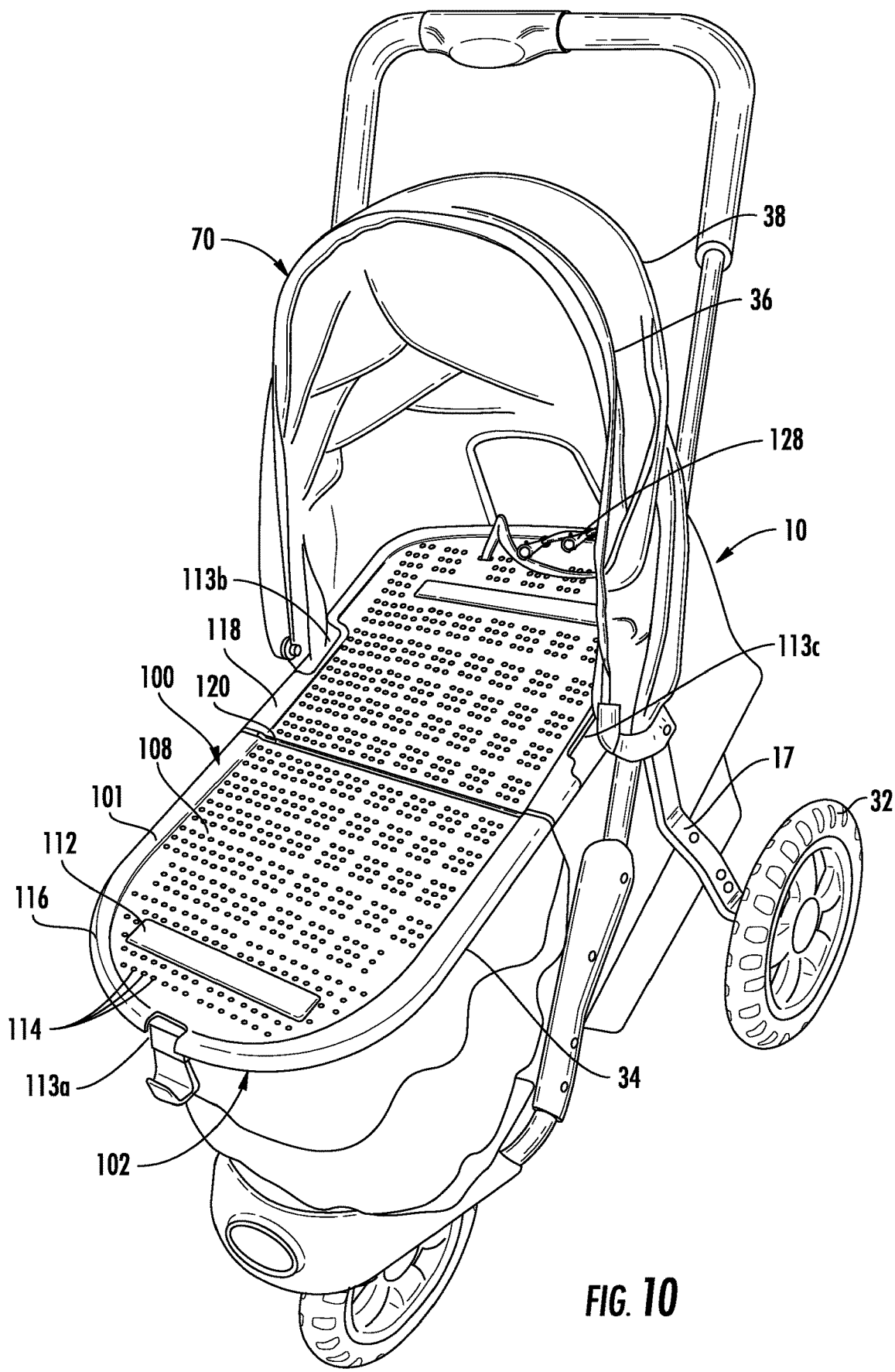
FIG. 10 is view similar to FIG. 9 with the seating pad removed from the divider.

In one embodiment as shown in FIGS. 8, 10, and 13, the divider platform 101 of the divider 100 has an outer periphery 102 that overlaps the platform enclosure member 34, at least in sections. In a preferred embodiment, the outer periphery 102 that that overlaps the platform enclosure member 34 at least in sections has a receiving groove 104 formed therein that is complementary to the upper portion of the platform enclosure member 34. This is preferably a rounded depression located inwardly from the peripheral edge so that it cups or nests over the top portion of the platform enclosure member 34, at least in a front portion of the pet seating area. The thickness of the divider platform 101 in the area of the receiving groove 104 is preferably 0.125 inches or less so that the lower canopy bar 36 can be clamped to the platform enclosure member 34 with the portion of the divider platform 101 that overlaps the platform enclosure member 34, at least in sections, located between the lower canopy bar 36 and the platform enclosure member 34.

In order to provide a secure seating, the outer periphery 102 of the divider platform 101 is complementary to an inner contour of the pet seating area in sections that do not overlap the platform enclosure member 34. This is shown in FIGS. 9 and 10, and is important in that it prevents a pet from having its leg slip down between any space between the divider 100 and the inner wall defined by the inside of the canopy assembly 70. Cutouts 103a, 103b, 103c are provided in the periphery 102 of the divider platform 101 for the latch 80 and the rear pivot blocks 40, 41 in order to create a complementary fit. The size of the cutouts 103a, 103b, 103c can be varied.

The divider platform 101 has an upper surface 108. The upper surface 108 is preferably generally horizontal when the divider is installed on the platform enclosure member 34. A seating pad 110 is preferably connected to the upper surface 108 of the divider 100. Preferably, this connection is made using a releasable hook-and-loop type textile fastener 112, such as VELCRO®, which can be seen in FIG. 10. The seating pad 110 is preferably cloth and may have a foam cushion inside a cloth covering.

In one preferred arrangement, the divider platform 101 has perforations 114 extending through its upper surface 108 for ventilation or drainage.

Figure 14:
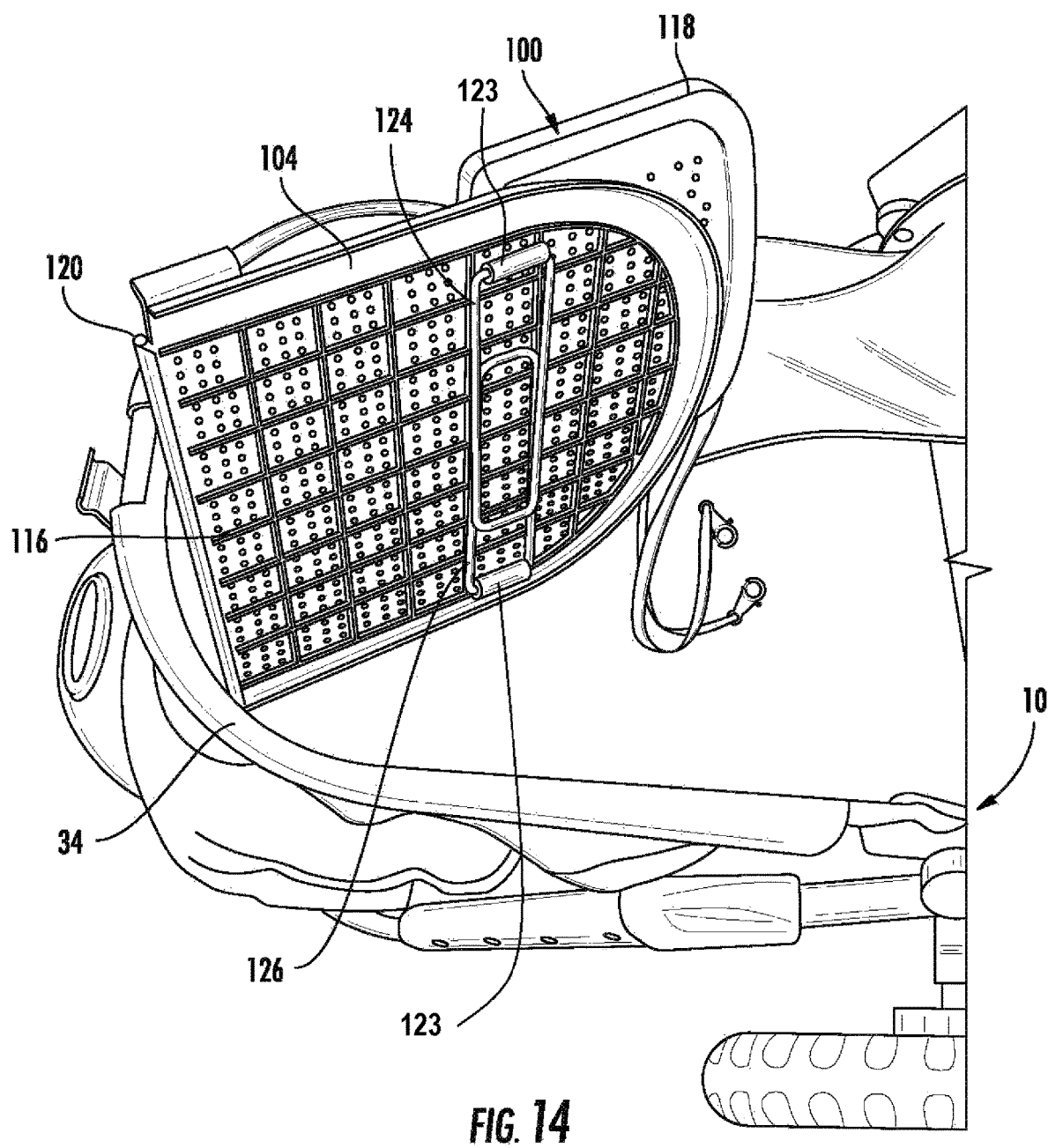
FIG. 14 is a view of the divider shown in a compact folded position.

FIGS. 8 and 13 show detail views of the divider 100 alone, removed from the pet stroller 10. Here, the divider 100 is preferably formed as first and second platform parts 116, 118 that are connected together by a hinge 120. The first and second platform parts 116, 118 are preferably made of a molded polymeric material. The hinge 120 is preferably limited to a 180° open position so that together, the first and second platform parts 116, 118 form the generally flat divider platform 101 when in the open position. The hinge 120 allows the divider platform parts 116, 118 to be folded together to a compact position for storage, as seen in FIG. 14.

The first platform part 116 preferably includes the receiving groove 104 around its outer periphery that is supported by the upper platform enclosure member 34. The second platform part 118 may also include sections of the receiving groove 104 as shown in FIG. 13.

Preferably, at least one foldable support leg 122, 134, 126 is connected to the underside of the second platform part 118. The first foldable support leg 122 can be made of metal, and in the folded position lies against the underside of the divider platform 101, and in particular the second platform part 118. The foldable support leg 122 is preferably pivotally attached to integrally molded lugs 123 on the underside of the second platform part 118. The first foldable support leg 122 preferably snaps into a fixed, extended position and is adapted to be supported on the baseboard 54 when the divider 100 is installed in the pet stroller 10. As shown in FIGS. 11 and 13, additional foldable support legs 124, 126 may also be connected to the underside of the first platform part 116. The second and third foldable support legs 124, 126 can also be made of metal, and in the folded position lie against the underside of the divider platform 101, and in particular the first platform part 116. The second and third foldable support leg 124, 126 are preferably attached to integrally molded lugs 123 on the underside of the first platform part 116. The foldable support legs 124,126 preferably snap into a fixed, extended position and are adapted to be supported on the baseboard 54 when the divider 100 is installed in the pet stroller 10.

Optionally, as shown in FIGS. 9 and 10 at least one tether 128 is connected to the divider 100. This can be used to secure a pet by attaching it to the collar or harness on the pet.

The divider 100 is preferably installed in the pet seating area of the pet stroller 10 to provide an elevated seating area within the canopy 70 enclosed seating area that is suitable for small to very small pets, while at the same time providing an additional storage area in the pet stroller 20 between the divider 200 and the platform base 54. This can be done without any structural changes to the known pet stroller 10 while still maintaining all of the original functionality. The divider 100 can be provided with the stroller 10 or provided separately as a retro-fit part. Different model pet strollers 10 will require different dividers 100 with the outer peripheries 102 designed to complement the particular stroller 10.

The stroller 10 can be a 3 wheel stroller, and the frame is not limited to a particular number of front or rear wheel struts. The specific construction and arrangement of the frame members and platform members can be varied. However, the platform enclosure member 34 is provided in the use position generally parallel to the platform member 54, and the cloth platform enclosure is connected to the platform enclosure member and the handle or other frame portion, and is required to define the base and the sidewall of the pet seating area. The upper and lower canopy bars are also provided and are pivotally mounted to the frame assembly to extend or retract a canopy over the pet seating area. The cloth and mesh canopy assembly is connected to the handle and the upper and lower canopy bars. The latch is connected to the platform enclosure member. Other features of the invention can also be used with the 3 wheel stroller arrangement.

While the preferred embodiment of the present invention has been described in detail, it will be recognized by those skilled in the art from the present disclosure that changes may be made to the above described embodiment of the invention without departing from the broad inventive concept thereof. It is understood, therefore, that this invention covers all modifications that are within the scope and spirit of the invention as defined by the appended claims and/or shown in the attached drawings.

What is claimed is:

1. A divider for dividing an enclosed pet seating area of a pet stroller to accommodate smaller pets, the divider comprising:
   a divider platform with an outer periphery that is adapted to overlap a platform enclosure member of the pet stroller at least in sections, a receiving groove in the divider platform formed by a rounded depression located inwardly from a peripheral edge that is complementary to an upper portion of the platform enclosure member, and at least one cutout along the outer periphery that interrupts the receiving groove that is adapted to create a complementary fit around at least one of a latch or rear pivot blocks of the pet stroller.

2. The divider of claim 1, wherein the outer periphery is complementary to an inner contour of a pet stroller pet seating area in sections that do not overlap the platform enclosure member.

3. The divider of claim 1, further comprising an upper surface with a seating pad connected thereto using a releasable hook-and-loop type textile fastener.

4. The divider of claim 1, wherein the divider platform is perforated for ventilation or drainage.

5. The divider of claim 1, wherein the divider platform is formed of first and second platform parts that are connected together by a hinge.

6. The divider of claim 5, wherein the hinge is limited to a 180° open position.

7. The divider of claim 5, wherein the first and second platform parts are molded from a polymeric material.

8. The divider of claim 5, further comprising at least one foldable support leg connected to an underside of the divider platform.

9. The divider of claim 8, wherein the at least one foldable support leg comprises three foldable support legs connected to the underside of the divider platform, with at least one of the foldable support legs being connected to the first platform part and at least one of the foldable support legs being connected to the second platform part.

10. The divider of claim 9, wherein the foldable support legs are movable from a folded position lying against the underside of the divider platform, to a fixed, extended position.

11. The divider of claim 10, wherein the foldable support legs are connected to lugs integrally formed on the underside of the divider platform that are located inwardly from the receiving groove.

12. The divider of claim 8, wherein the at least one foldable support leg has an extended height that is adapted to provide for support against a platform base of the pet stroller.

13. The divider of claim 5, wherein the first platform part includes a front section opposite to a hinge side, and the outer periphery in the front section has a rounded profile in plan view such that it is adapted to be complementary to an upper portion of the platform enclosure member.

14. The divider of claim 13, wherein the at least one cutout includes a latch cutout located in the front section that is adapted to be complementary to the latch of the pet stroller.

15. The divider of claim 14, wherein the at least one cutout further comprises two cutouts in the second platform part located on opposite sides of the outer periphery that are adapted to be complementary to the rear pivot blocks of the pet stroller.

16. The divider of claim 1, further comprising at least one tether connected thereto.

17. The divider of claim 1, wherein a thickness of the divider platform in an area of the receiving groove is 0.125 inches or less.

* * * * *